(12) United States Patent
Sano (10) Patent No.: US 8,462,434 B2
(45) Date of Patent: Jun. 11, 2013

(54) POLARIZING BEAM SPLITTER AND OPTICAL APPARATUS INCLUDING THE SAME

(75) Inventor: Daisuke Sano, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 360 days.

(21) Appl. No.: 12/274,138

(22) Filed: Nov. 19, 2008

(65) Prior Publication Data

US 2009/0128903 A1    May 21, 2009

(30) Foreign Application Priority Data

Nov. 20, 2007    (JP) ................. 2007-300270

(51) Int. Cl.
  *G02B 5/30*    (2006.01)
(52) U.S. Cl.
  CPC .................... *G02B 5/3066* (2013.01)
  USPC .................................... 359/485.02
(58) Field of Classification Search
  None
  See application file for complete search history.

(56) References Cited

U.S. PATENT DOCUMENTS

| 5,042,925 | A | 8/1991 | Broer et al. |
| 7,116,478 | B2 | 10/2006 | Momoki et al. |
| 2005/0045799 | A1* | 3/2005 | Deng et al. ..................... 250/200 |
| 2005/0078372 | A1* | 4/2005 | Momoki et al. ............... 359/495 |
| 2006/0092513 | A1* | 5/2006 | Momoki ........................ 359/486 |
| 2006/0119937 | A1* | 6/2006 | Perkins et al. ................ 359/486 |

FOREIGN PATENT DOCUMENTS

| JP | 2005-114857 A | 4/2005 |
| JP | 2006-133403 A | 5/2006 |

* cited by examiner

*Primary Examiner* — Derek S Chapel
(74) *Attorney, Agent, or Firm* — Canon U.S.A., Inc., IP Division

(57) ABSTRACT

A polarizing beam splitter has a periodic structure including a plurality of structured portions periodically disposed in a first direction at intervals equal to or shorter than a used wavelength. The periodic structure satisfies a condition that, of an incident light flux, polarized light that vibrates in one direction is totally reflected. The polarizing beam splitter has an optical interference layer disposed adjacent to the periodic structure and including at least one thin film layer.

7 Claims, 11 Drawing Sheets

COMPARATIVE EXAMPLE 1
— S-POLARIZED LIGHT

FIG.8B

COMPARATIVE EXAMPLE 1
— P-POLARIZED LIGHT

FIG. 9B
COMPARATIVE EXAMPLE 2_P-POLARIZED LIGHT

FIG. 9A
COMPARATIVE EXAMPLE 2_S-POLARIZED LIGHT

FIG.11A SECOND EXEMPLARY EMBODIMENT — S-POLARIZED LIGHT

FIG.11B SECOND EXEMPLARY EMBODIMENT — P-POLARIZED LIGHT

FIG.12A
THIRD EXEMPLARY EMBODIMENT
— S-POLARIZED LIGHT

FIG.12B
THIRD EXEMPLARY EMBODIMENT
— P-POLARIZED LIGHT

FIG.13B
FOURTH EXEMPLARY EMBODIMENT_
P-POLARIZED LIGHT

FIG.13A
FOURTH EXEMPLARY EMBODIMENT_
S-POLARIZED LIGHT

FIG.14

POLARIZING BEAM SPLITTER AND OPTICAL APPARATUS INCLUDING THE SAME

BACKGROUND OF THE INVENTION

1. Field of the Invention

The present invention relates to a polarizing beam splitter and an optical apparatus including the polarizing beam splitter. More specifically, the present invention relates to a photographic optical system, a projection optical system (a projector), an image processing apparatus, a semiconductor manufacturing apparatus, an optical disk recording/reproduction apparatus (an optical pickup apparatus), and other various optical devices.

2. Description of the Related Art

A conventional polarizing beam splitter includes two types of media, which are different in refractive index and cooperatively constitute a dielectric multilayered film configured to split polarized light.

Figure 2:
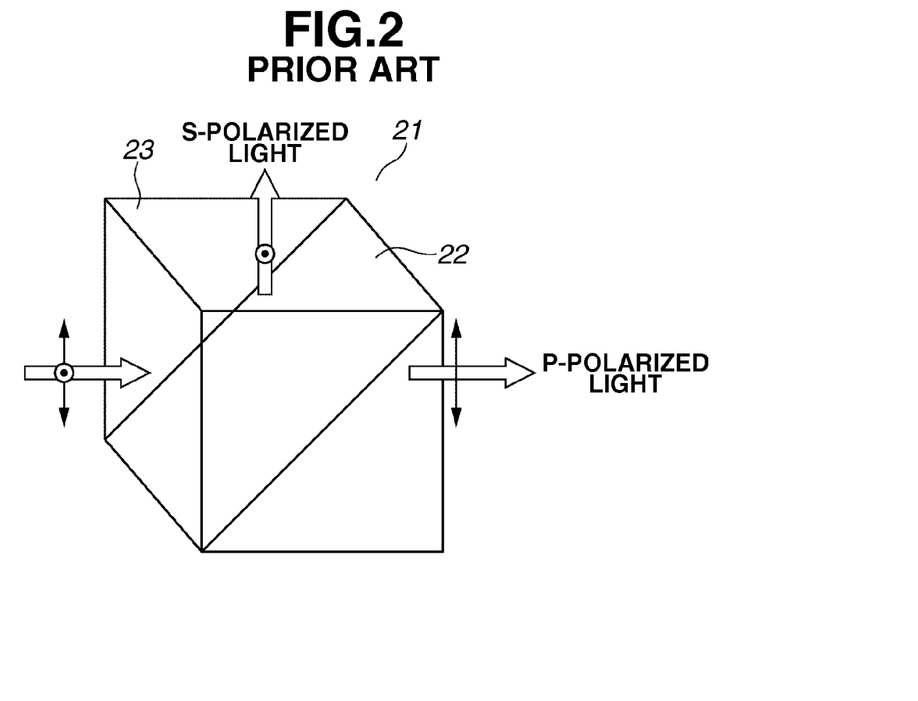
FIG. 2 is a perspective view illustrating a conventional polarizing beam splitter.

FIG. 2 illustrates a conventional polarizing beam splitter using prisms. As illustrated in FIG. 2, a polarizing beam splitter (PBS) 21 includes a dielectric multilayered film 22, which transmits p-polarized light (one of polarized beams) incident thereon at Brewster's angle. On the other hand, s-polarized light interferes with the dielectric multilayered film 22 and is reflected by the dielectric multilayered film 22.

In general, the following formula (1) defines Brewster's angle $\theta_b$ where $n_1$ represents the refractive index of a medium positioned on the incident side and $n_2$ represents the refractive index of a medium positioned on the exit side in the condition where two neighboring media are present via an interface.

$$\tan\theta_b = n_2/n_1 \tag{1}$$

To separate polarized light, a medium constituting a prism 23 and a plurality types of media forming the dielectric multilayered film 22 (e.g., a higher refractive index layer (H layer) and a lower refractive index layer (L layer)) are required to satisfy the above-mentioned relationship.

To this end, the relationship defined by the following formula (2) is required to be satisfied, where $n_p$ represents the refractive index of the medium constituting the prism 23, $n_H$ represents the refractive index of the higher refractive index layer constituting the dielectric multilayered film 22, and $n_L$ represents the refractive index of the lower refractive index layer constituting the dielectric multilayered film 22.

$$n_p = \sqrt{\frac{n_H^2 + n_L^2}{\sin^2\theta_b(n_H^2 + n_L^2)}} \tag{2}$$

The dielectric multilayered film 22 functions as a reflection film, which causes s-polarized light to be reflected by an interface between a medium H of the high refractive index layer and a medium L of the low refractive index layer. The dielectric multilayered film 22 includes 20 to 40 layers, which cooperatively constitute a reflection film operable in the entire visible light range.

Regarding s-polarized light, the dielectric multilayered film 22 can widen angle characteristics and wavelength characteristics by increasing the number of layers constituting the multilayered film.

On the other hand, as discussed in U.S. Pat. No. 5,042,925, a polarizing beam splitter can include an adhesive layer having optical anisotropy and being sandwiched between two prisms, instead of using a dielectric multilayered film.

The difference in refractive index between birefringent materials is a key factor in operation of the polarizing beam splitter discussed in U.S. Pat. No.5,042,925. In this case, although the refractive index difference is small, if the incident angle of light is 60° or a sufficiently large angle, the polarizing beam splitter can totally reflect one of two polarized beams selectively.

To ensure total reflection, it is required to set the incident angle of light to be equal to or greater than a critical angle $\theta_c$. Where $n_1$ represents the refractive index of the incident side medium and $n_2$ represents the refractive index of the exit-side medium, the following formula (3) defines the critical angle $\theta_c$.

$$\sin\theta_c = n_2/n_1 \tag{3}$$

On the other hand, as discussed in U.S. Pat. No. 7,116,478, a polarizing beam splitter can use a grating structure having a periodic pattern equivalent to or less than the wavelength of light.

According to the polarizing beam splitter discussed in U.S. Pat. No. 7,116,478, a polarized beam splitting layer includes a structured layer, in which a plurality of gratings parallel to a first direction are periodically disposed in a second direction orthogonal to the first direction.

The polarizing beam splitter splits polarized light into a polarized light component of the first direction and a polarized light component of the second direction by reflecting and transmitting the light.

The structured layer discussed in U.S. Pat. No. 7,116,478, which is characterized by a periodic arrangement of gratings disposed at intervals equivalent to or less than the wavelength of light, is generally referred to as a "subwavelength periodic structure (SWS)."

Because of a minute structure characterized by intervals (periods) shorter than the wavelength of light, the structure of SWS is not recognizable, and, therefore, SWS has characteristics similar to a uniform medium. Therefore, SWS can function as a layer having an equivalent refractive index determined by refractive indices of constituent materials and the ratio of them. Furthermore, SWS can function as a layer having strong anisotropy if it is configured to have a periodic structure differentiated in each direction.

According to U.S. Pat. No. 7,116,478, a large difference in refractive index can be provided between s-polarized light and p-polarized light which are incident on a surface of the polarizing beam splitter using SWS. Therefore, the polarizing beam splitter can totally reflect only one of the polarized beams. In other words, the polarizing beam splitter can easily satisfy a required reflection condition.

For example, if gratings of SWS (structured layer) are periodic in a direction parallel to an incident plane, a polarized beam splitting layer can totally reflect p-polarized light and transmit s-polarized light. Furthermore, the polarized light that is totally reflected is adjustable by changing the periodic direction of the structure.

The structure discussed in U.S. Pat. No. 7,116,478 is superior, in incident angle characteristics, to a polarizing beam splitter including a dielectric multilayered film utilizing the Brewster's angle.

A general polarizing beam splitter including a dielectric multilayered film, which causes optical interference, utilizes the Brewster's angle for splitting polarized light. Therefore, both incident angle characteristics and broadband characteristics tend to be inferior. Furthermore, if design is prioritized for characteristics of one polarized light, the design will adversely influence characteristics of the other polarized light. Thus, if required to satisfy both requirements, the design becomes very complicated.

The polarizing beam splitter having the SWS structure discussed in U.S. Pat. No. 7,116,478 can effectively split the incident light into s-polarized light and p-polarized light.

However, the polarizing beam splitter discussed in U.S. Pat. No. 7,116,478 tends to generate a large change in incident angle characteristics (characteristics in a relationship between incident angle and reflectance).

Therefore, there is a tendency that, if a polarizing beam splitter is incorporated in an optical pickup apparatus, it becomes difficult to detect the quantity of light entering a monitor photo-detector to adjust the quantity of light entering an optical disk.

Moreover, it is difficult to arbitrarily adjust the characteristics of a polarizing beam splitter for a predetermined polarized light component incident thereon in a wide wavelength range to adequately maintain broadband characteristics.

SUMMARY OF THE INVENTION

Exemplary embodiments of the present invention are directed to a polarizing beam splitter capable of, when light incident thereon is polarized in directions orthogonal to each other, arbitrarily adjusting the reflected light quantity and the transmitted light quantity of the light polarized in one direction while maintaining excellent incident angle characteristics and broadband characteristics. Exemplary embodiments of the present invention are also directed to an optical apparatus including such polarizing beam splitter.

According to an aspect of the present invention, a polarizing beam splitter has a periodic structure including a plurality of structured portions periodically disposed in a first direction at intervals equal to or shorter than a used wavelength, wherein the periodic structure satisfies a condition that, of an incident light flux, polarized light that vibrates in one direction is totally reflected, and an optical interference layer disposed adjacent to the periodic structure and including at least one thin film layer.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain the principles of the invention.

DETAILED DESCRIPTION OF THE EMBODIMENTS

The following description of exemplary embodiments is illustrative in nature and is in no way intended to limit the invention, its application, or uses. Throughout the specification, like reference numerals and letters refer to like items in the figures. To avoid redundancy, an item described with respect to one figure may not be described further for the other figures. Exemplary embodiments are described in detail below with reference to the drawings.

As an example optical apparatus including a polarizing beam splitter according to an exemplary embodiment of the present invention, an optical pickup apparatus and an image projection apparatus are described with reference to the drawings.

A polarizing beam splitter according to an exemplary embodiment includes a polarized beam splitting layer, which includes a plurality of gratings parallel to a first direction TE and periodically disposed in a second direction TM orthogonal to the first direction at intervals (periods) equal to or less than the wavelength of used light (e.g., 350 nm to 900 nm) so as to constitute a structured layer (referred to as "SWS grating structure" or "SWS layer"). Here, the wavelength of used light can be wavelengths of whole light components, which are incident in the polarizing beam splitter, for example, of an optical pickup apparatus or an image projection apparatus in the exemplary embodiments, or a wavelength of a specific light component of all light components. In addition, the intervals (periods) are preferably equal to or less than 300 nm, and more preferably equal to or less than 200 nm.

The polarized beam splitting layer has an arrangement satisfying a refractive index condition that polarized light, of incident light flux, which vibrates in one direction, is totally reflected. In this case, the incident light flux is light having a wavelength in the visible range (wavelength not less than 400 nm and not greater than 700 nm). The light in this wavelength range can be referred to as "used wavelength."

Furthermore, the polarized beam splitting layer can reflect part of polarized light that vibrates in the other direction orthogonal to the one direction and can transmit the rest.

An optical interference layer, including one or more thin film layers, is interposed between the structured layer and a medium provided on its incident or exit side.

Figure 1:
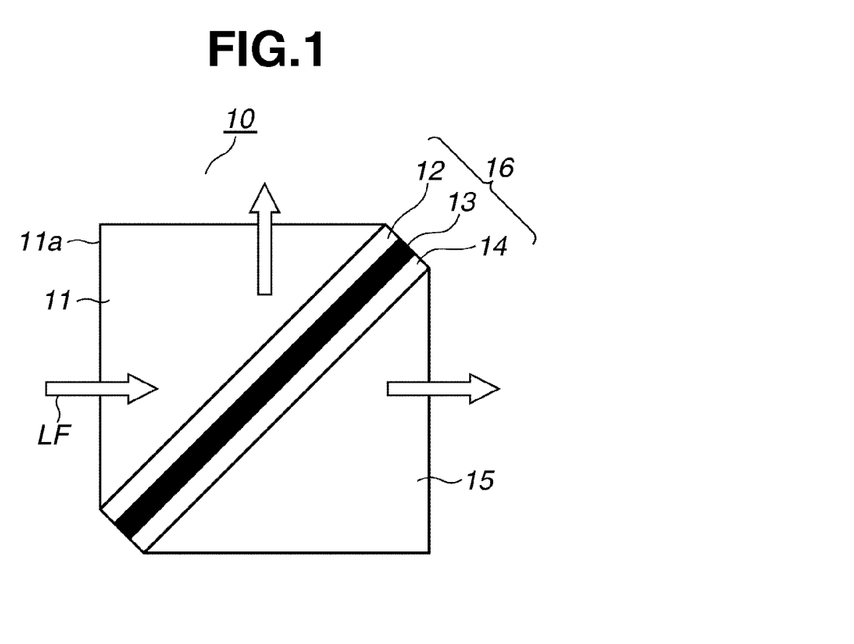
FIG. 1 is a cross-sectional view illustrating a polarizing beam splitter according to a first exemplary embodiment of the present invention.

FIG. 1 is a cross-sectional view illustrating a polarizing beam splitter 10 according to a first exemplary embodiment of the present invention. The polarizing beam splitter 10 illustrated in FIG. 1 includes an incident prism 11, a polarized beam splitting layer 16, and an exit prism (exit medium) 15.

The polarized beam splitting layer 16 includes a structured layer 13 constituted by an SWS layer (having a SWS grating structure), an optical interference layer 12 disposed on a light incident side of the structured layer 13, and an optical interference layer 14 disposed on a light exit side of the structured layer 13.

Inclination of the polarized beam splitting layer 16 relative to an incident surface 11a of the incident prism 11 is approximately 45 degrees.

Figure 3:
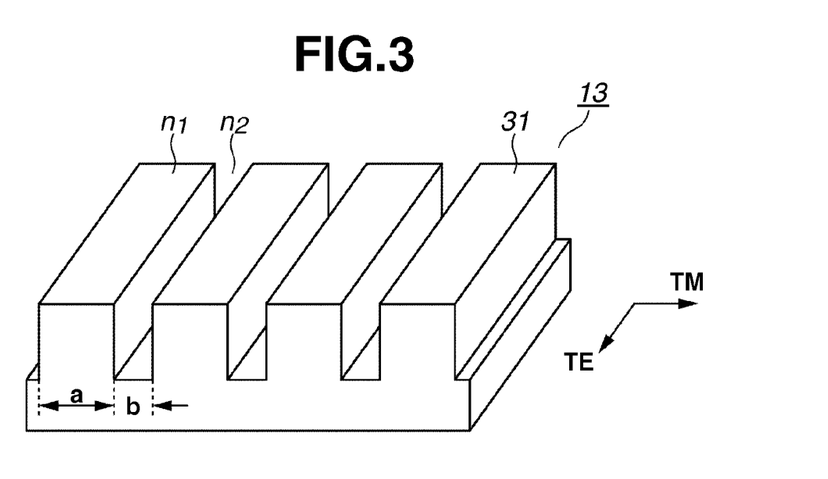
FIG. 3 is a perspective view illustrating an example sub-wavelength periodic structure (SWS).

FIG. 3 is a perspective view illustrating a structured layer 13. The structured layer 13 has a rectangular grating structure characterized by a repetition of a part filled with air and another part constituted by a dielectric medium, which are alternated along one dimension.

More specifically, the structured layer 13 includes a plurality of gratings 31, which are parallel to the first direction TE and periodically disposed in the second direction TM orthogonal to the first direction TE at predetermined intervals equal to or less than the wavelength of used light. As illustrated in FIG. 3, the structured layer 13 includes one medium constituted by air (refractive index $n_2$) and the other medium (refractive index $n_1$) configured into a rectangular grating shape.

In the structured layer 13 illustrated in FIG. 3, a rectangular grating structure includes two types of media having refractive indices $n_1$ and $n_2$ and alternately arranged at the ratio (pitch) of a:b {filling factor f=a/(a+b)}, in which TE represents the direction parallel to the gratings 31 and TM represents the direction orthogonal to the gratings 31. The following formulae (4) and (5) define equivalent refractive indices in the TE direction and in the TM direction, respectively.

$$TE \ n_{TE} = \sqrt{\frac{an_1^2 + bn_2^2}{a+b}} \quad (4)$$

$$TM \ n_{TM} = \sqrt{\frac{a+b}{a/n_1^2 + b/n_2^2}} \quad (5)$$

Figure 6:
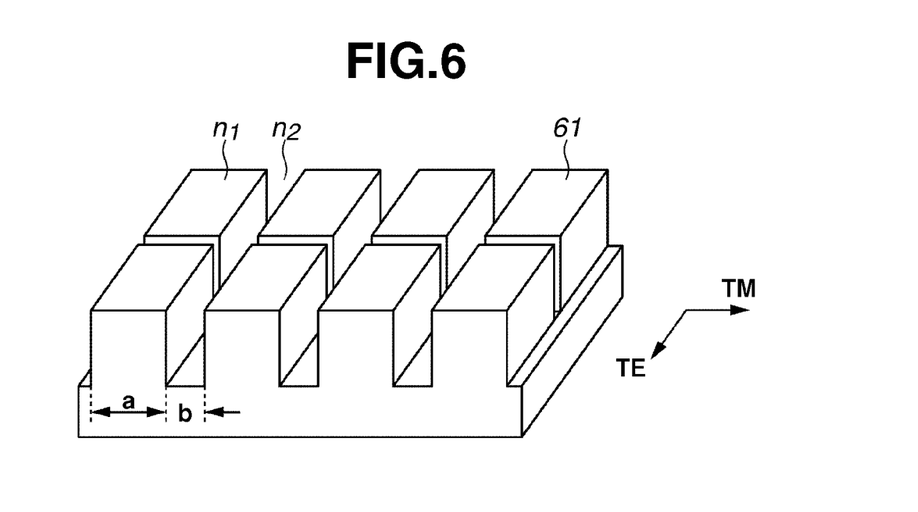
FIG. 6 is a perspective view illustrating an example sws.

The structured layer 13 according to the above-described exemplary embodiment can be modified appropriately. For example, as illustrated in FIG. 6, a structured layer having gratings 61 partly split in the TE direction is usable.

When $n_T$ represents the equivalent refractive index experienced by one polarized light component incident on the structured layer 13 and $n_1$ represents the refractive index of the medium constituting the incident prism 11, the critical angle $\theta_c$ can be defined by the following formula (3a)

$$\sin\theta_c = n_T/n_1 \quad (3a)$$

Of light flux LF, one polarized light component has an incident angle $\theta$ equal to or greater than the critical angle $\theta_c$. Namely, the following relationship is satisfied.

$$\sin^{-1}(n_T/n_1) < \theta \quad (3b)$$

Thus, the structured layer 13 can totally reflect one polarized light component of the incident light flux LF.

Figure 4:
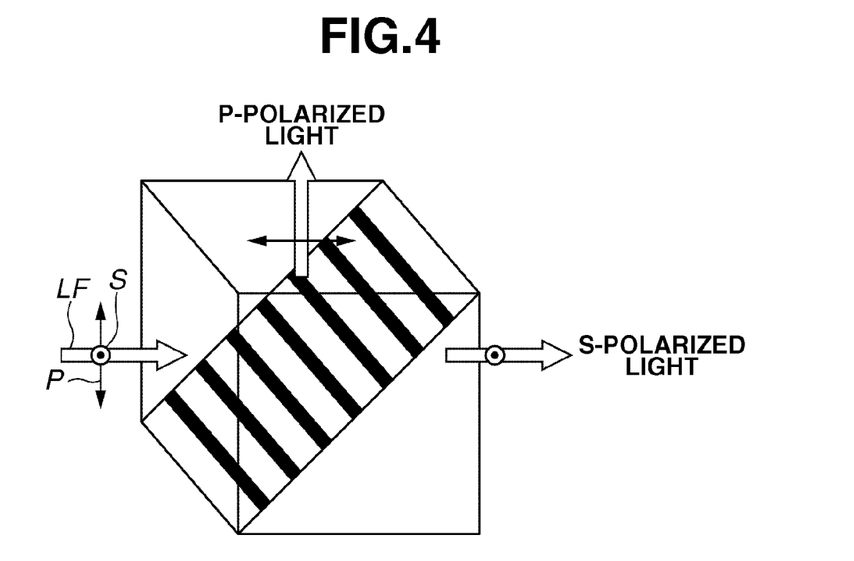
FIG. 4 is a perspective view illustrating an example polarizing beam splitter including strong anisotropic SWS capable of causing total reflection.
Figure 5:
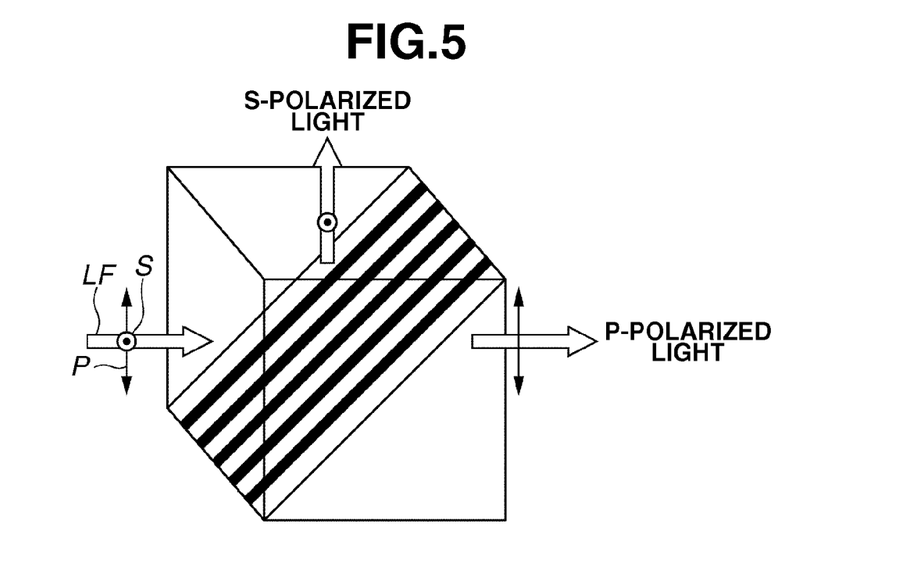
FIG. 5 is a perspective view illustrating an example polarizing beam splitter including strong anisotropic SWS capable of causing total reflection.

FIGS. 4 and 5 illustrate example arrangements of the polarizing beam splitter 10 including the structured layer 13 that can split incident light into polarized beams.

If the structured layer 13 has a periodic structure in a direction (orthogonal to the drawing plane of FIG. 1) normal to the illustration of the incident plane on the drawing surface of FIG. 1 (see FIG. 5), the polarizing beam splitter 10 reflects s-polarized light and transmits p-polarized light of the incident light flux LF. Such a periodic structure is illustrated in FIG. 5.

On the other hand, if the structured layer 13 has a periodic structure in the direction of the illustration of the incident plane on the drawing surface of FIG. 1 (see FIG. 4), the polarizing beam splitter 10 transmits s-polarized light and reflects p-polarized light of the incident light flux LF. Such a periodic structure is illustrated in FIG. 4.

In an exemplary embodiment, the equivalent refractive index $n_T$ can be determined according to the grating period of the structured layer 13, the filling factor, and the periodic direction. Thus, the condition that one polarized light of incident light flux is totally reflected by the structured layer 13 can be satisfied.

The polarizing beam splitter 10 according to an exemplary embodiment can realize efficient polarized beam splitting by totally reflecting one polarized light component.

However, it is known that light generally referred to as "evanescent wave" oozes in a very minute area near a boundary surface of the polarized beam splitting layer 16. If a medium having higher dielectric constant is present in a region where the evanescent wave can reach, the light will be transmitted unexpectedly even if the total reflection condition is satisfied. With such a medium, efficiency deteriorates. This phenomenon is referred to as "attenuated total reflection (ATR)."

To reduce transmission of the evanescent wave, it is desired that the structured layer 13 satisfying the total reflection condition has a sufficient thickness greater than a predetermined value. More specifically, it is desired that the structured layer 13 has a thickness equal to or greater than 150 nm (preferably, equal to or greater than 300 nm).

The polarized beam splitting layer 16 illustrated in FIG. 1 includes the uniform optical interference layer 12 sandwiched between the structured layer 13 and the prism 11 and the uniform optical interference layer 14 sandwiched between the structured layer 13 and the prism 15. Each of the optical interference layers 12 and 14 is a uniform layer, which has a film thickness capable of utilizing the interference of light and can be constituted by a dielectric member. More specifically, it is desired that each optical interference layer 12 or 14 has a thickness equal to or greater than 30 nm (preferably, equal to or greater than 60 nm).

In an exemplary embodiment, the following relationship is satisfied where n' and n" represent equivalent refractive indices of the structured layer 13 relative to respective incident polarized beams, $n_a$ represents the refractive index of the optical interference layers 12 and 14, and $n_b$ represents the refractive index of the incident medium (incident medium) 11 or the exit medium 15.

$$\frac{n' + n''}{2} < n_a < n_b$$

Polarized light A (one component of the incident polarized light LF) satisfies the condition of total reflection by the structured layer 13. More specifically, even if the optical interference layers 12 and 14 are provided, the polarized light A can be totally reflected by the structured layer 13. On the other hand, polarized light B (having a polarization plane orthogonal to that of the polarized light A) is not totally reflected because its refractive index in the structured layer 13 is different from that of the polarized light A.

More specifically, the optical interference layers 12 and 14 do not interact with the polarized light A but influences the polarized light B. From this phenomenon, the optical interference layers 12 and 14 can be designed taking only the polarized light B into consideration. Moreover, the polarized light A and polarized light B can be any of s-polarized light and p-polarized light depending on the design of the polarizing beam splitter 10. Any desired arrangement can be selected.

Hereinafter, exemplary embodiments of the present invention and comparative examples are described with reference to given design values. However, the present invention is not limited to the following description of the exemplary embodiments. Table-1 illustrates design standard 1 used for a pickup apparatus illustrated in FIG. 7. Table-2 illustrates design standard 2 used for an ordinary polarizing beam splitter.

Table-3 illustrates example numerical values applied to exemplary embodiments of the present invention and a comparative example.

Figure 8A:
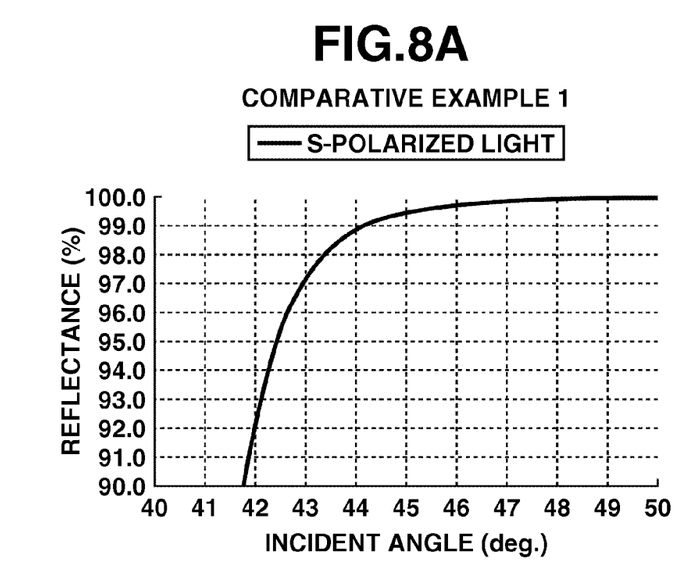
FIG. 8A illustrates polarization characteristics of s-polarized light having a wavelength of 407 nm, in the relationship between incident angle and reflectance, according to comparative example 1.
Figure 8B:
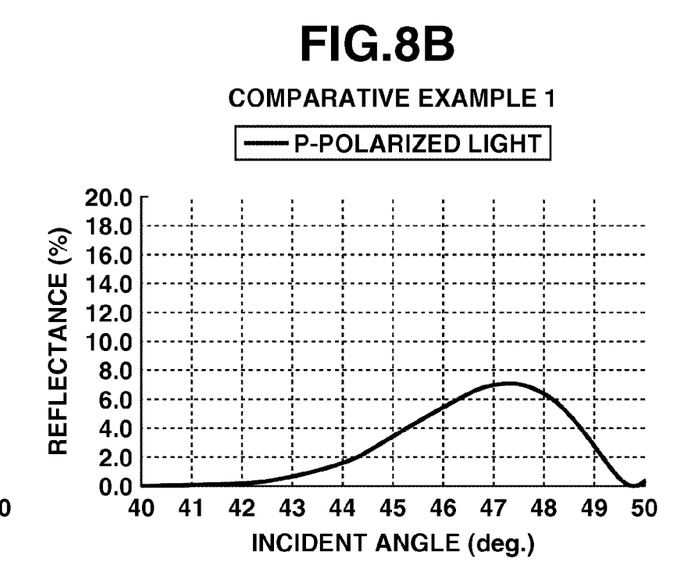
FIG. 8B illustrates polarization characteristics of p-polarized light having a wavelength of 407 nm, in the relationship between incident angle and reflectance, according to the comparative example 1.

FIGS. 8A and 8B illustrate polarization characteristics of a polarizing beam splitter according to comparative example 1, obtained based on the design standard 1 illustrated in Table-1. A polarized beam splitting layer according to the comparative example 1 includes only a structured layer and, therefore, does not include any optical interference layer. The polarized light A is s-polarized light and the polarized light B is p-polarized light. As understood from FIGS. 8A and 8B, the structured layer can differentiate characteristics of the s-polarized light from characteristics of the p-polarized light due to its anisotropy.

In both characteristics, reflectance varies widely relative to incident angle. Characteristics of the s-polarized light deteriorate due to ATR. If the thickness of the structured layer is increased to improve the characteristics of the s-polarized light, characteristics of the p-polarized light shift toward the long wavelength side. Accordingly, realizing well-balanced design for both characteristics is difficult.

Figure 9A:
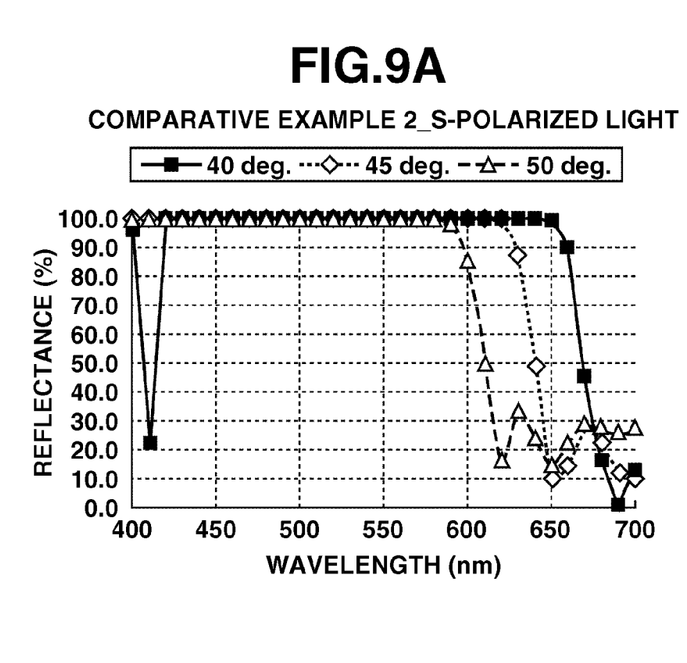
FIG. 9A illustrates polarization characteristics of s-polarized light having a wavelength in the range from 400 to 700 nm, in the relationship between incident angle and reflectance, according to comparative example 2.
Figure 9B:
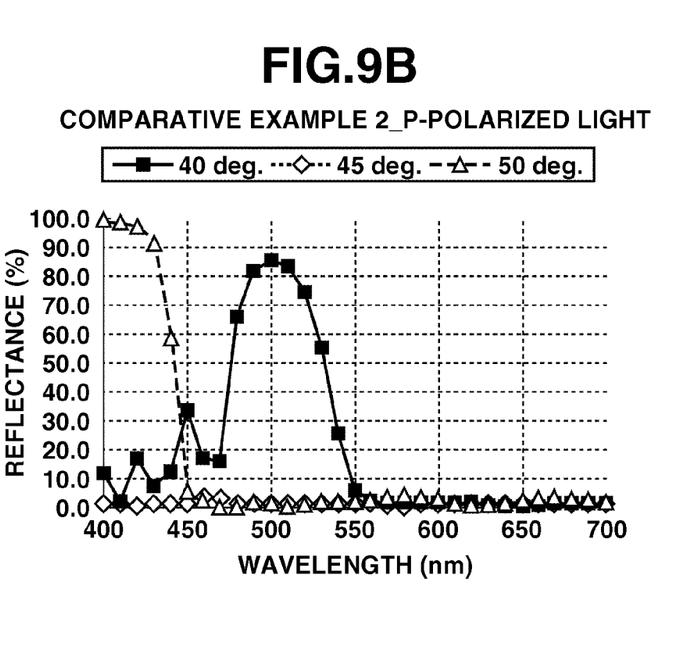
FIG. 9B illustrates polarization characteristics of p-polarized light having a wavelength in the range from 400 to 700 nm, in the relationship between incident angle and reflectance, according to the comparative example 2.

FIGS. 9A and 9B illustrate polarization characteristics of a polarizing beam splitter according to comparative example 2, obtained based on the design standard 2 illustrated in Table-2. A polarized beam splitting layer according to the comparative example 2 includes a dielectric multilayered film, which is composed of 25 layers constituted by high refractive index layers and low refractive index layers. The dielectric multilayered film mainly reflects s-polarized light and transmits p-polarized light.

As understood from FIGS. 9A and 9B, characteristics greatly change if the incident angle shifts from 45 degrees by an amount of 5 degrees, although excellent performance can be obtained when the incident angle is fixed to 45 degrees. As the comparative example 2 is dependent on only the optical interference, it is difficult to obtain incident angle characteristics and broadband characteristics where interference conditions are not satisfied.

Figure 10A:
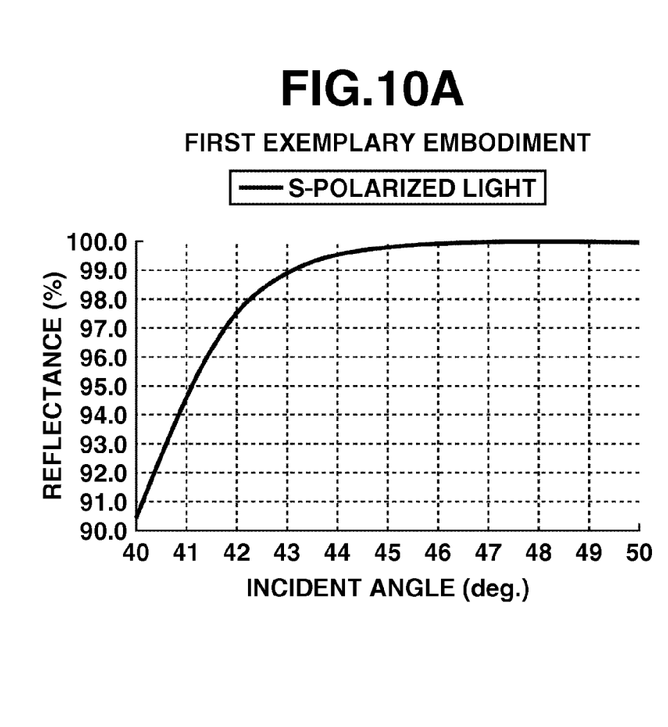
FIG. 10A illustrates polarization characteristics of s-polarized light having a wavelength of 407 nm, in the relationship between incident angle and reflectance, according to a first exemplary embodiment.
Figure 10B:
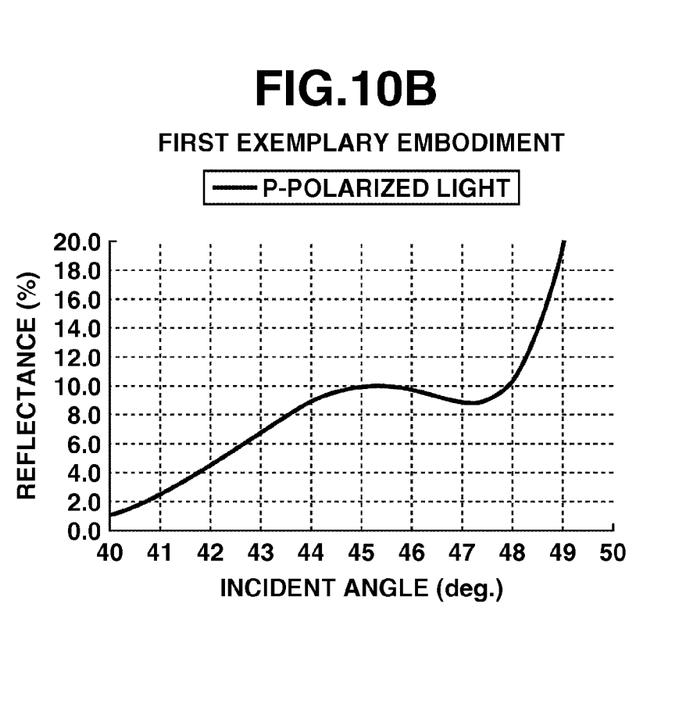
FIG. 10B illustrates polarization characteristics of p-polarized light having a wavelength of 407 nm, in the relationship between incident angle and reflectance, according to the first exemplary embodiment.

FIGS. 10A and 10B illustrate polarization characteristics of a polarizing beam splitter according to the first exemplary embodiment, obtained based on the design standard 1. A polarized beam splitting layer according to the first exemplary embodiment includes one optical interference layer sandwiched between a structured layer and a medium provided on the incident side and another optical interference layer sandwiched between the structured layer and a medium provided on the exit side.

In this case, the polarized light A is s-polarized light. The polarized light B is p-polarized light. As understood from FIGS. 10A and 10B, compared to the comparative example 1 illustrated in FIGS. 8A and 8B, both the s-polarized light and the p-polarized light satisfy the conditions of the design standard 1. This is because the p-polarized light can be well corrected by two optical interference layers, even if the thickness thereof is increased to prevent the s-polarized light from being adversely influenced by ATR.

Figure 11A:
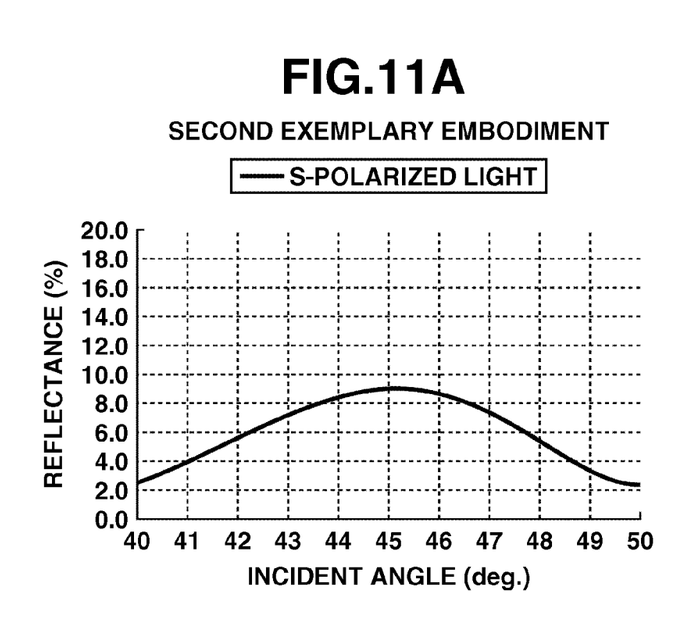
FIG. 11A illustrates polarization characteristics of s-polarized light having a wavelength of 407 nm, in the relationship between incident angle and reflectance, according to a second exemplary embodiment.
Figure 11B:
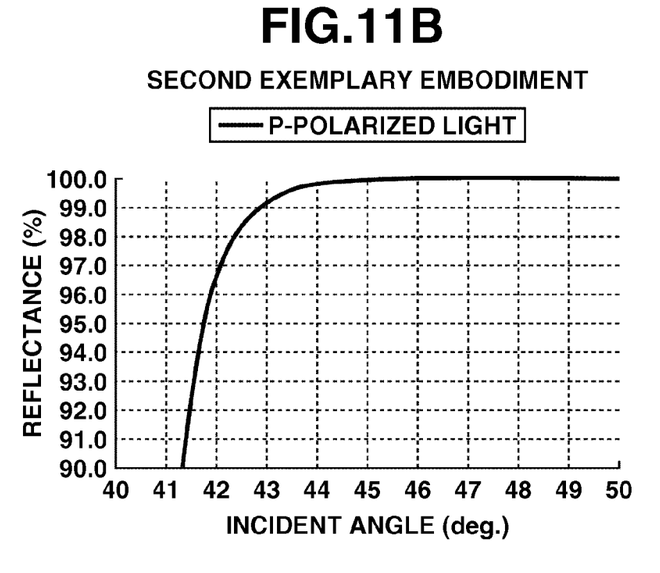
FIG. 11B illustrates polarization characteristics of p-polarized light having a wavelength of 407 nm, in the relationship between incident angle and reflectance, according to the second exemplary embodiment.

FIGS. 11A and 11B illustrate polarization characteristics of a polarizing beam splitter according to a second exemplary embodiment, obtained based on the design standard 1. A polarized beam splitting layer according to the second exemplary embodiment includes only one optical interference layer sandwiched between a structured layer and a medium provided on the exit side.

In this case, the polarized light A is p-polarized light. The polarized light B is s-polarized light. To eliminate the effect of ATR, the structured layer has a sufficiently large thickness. Accordingly, the p-polarized light satisfies the design standard. Furthermore, it is understood that a simple arrangement capable of satisfying the design standard 1 can be obtained by optimizing the optical interference layer only for the s-polarized light.

Figure 12A:
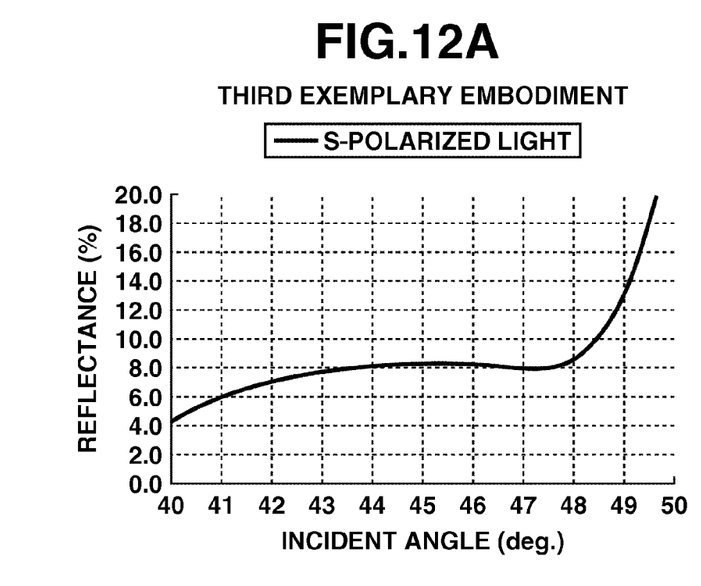
FIG. 12A illustrates polarization characteristics of s-polarized light having a wavelength of 407 nm, in the relationship between incident angle and reflectance, according to a third exemplary embodiment.
Figure 12B:
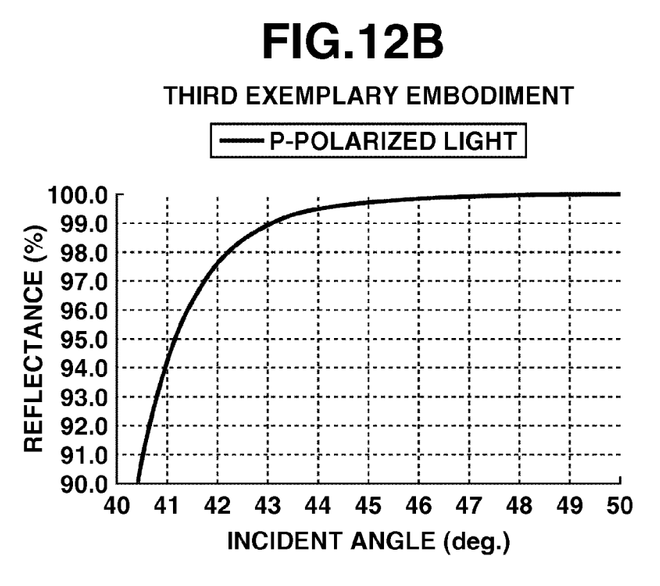
FIG. 12B illustrates polarization characteristics of p-polarized light having a wavelength of 407 nm, in the relationship between incident angle and reflectance, according to the third exemplary embodiment.

FIGS. 12A and 12B illustrate polarization characteristics of a polarizing beam splitter according to a third exemplary embodiment, obtained based on the design standard 1. A polarized beam splitting layer according to the third exemplary embodiment includes one optical interference layer sandwiched between a structured layer and a medium provided on the incident side and another optical interference layer sandwiched between the structured layer and a medium provided on the exit side.

In this case, the polarized light A is p-polarized light. The polarized light B is s-polarized light. The optical interference layer 14 positioned near the exit medium has a two-layered structure. Thus, compared to the first and second exemplary embodiments, the third exemplary embodiment can obtain characteristics more stable against a variation of incident angle.

Figure 13A:
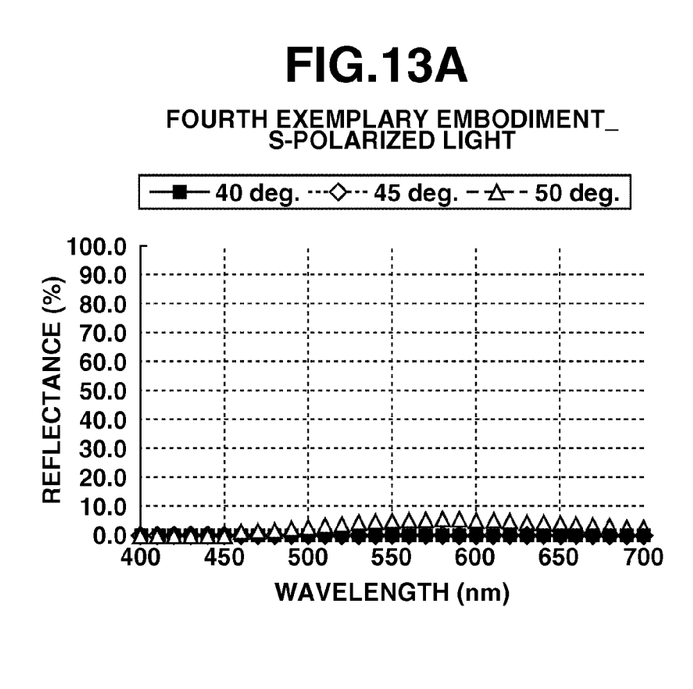
FIG. 13A illustrates polarization characteristics of s-polarized light having a wavelength in the range from 400 to 700 nm, in the relationship between incident angle and reflectance, according to a fourth exemplary embodiment.
Figure 13B:
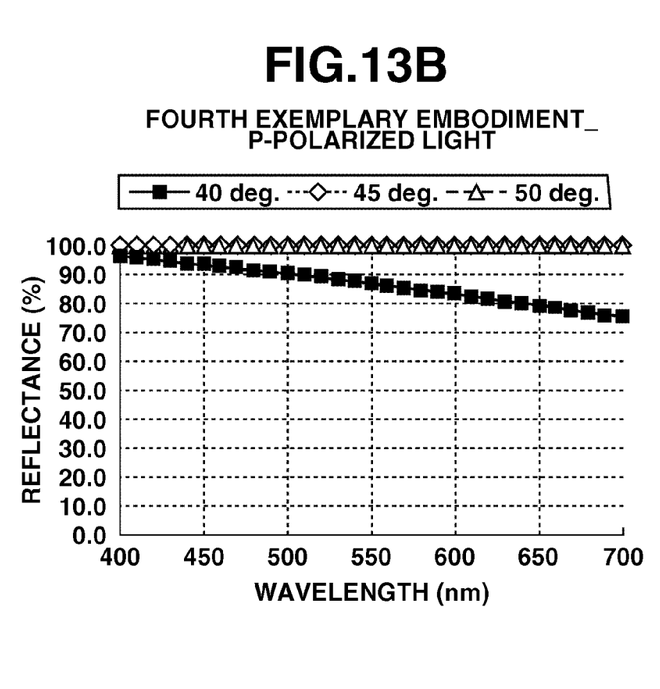
FIG. 13B illustrates polarization characteristics of p-polarized light having a wavelength in the range from 400 to 700 nm, in the relationship between incident angle and reflectance, according to the fourth exemplary embodiment.

FIGS. 13A and 13B illustrate polarization characteristics of a polarizing beam splitter according to a fourth exemplary embodiment, obtained based on the design standard 2. A polarized beam splitting layer according to the fourth exemplary embodiment includes only one optical interference layer sandwiched between a structured layer and a medium provided on the exit side.

In this case, the polarized beam splitting layer mainly transmits s-polarized light and mainly reflects p-polarized light. As understood from the characteristics illustrated in FIGS. 13A and 13B, the s-polarized light and the p-polarized light are well split when the incident angle is 45 degrees.

Furthermore, it is understood that characteristics are relatively stable even when the incident angle changes. This is because one polarized light (p-polarized light in this case) utilizes total reflection, and, therefore, any change in the incident angle does not influence the characteristics so much.

Moreover, the other polarized light (s-polarized light in this case) has relatively stable characteristics because the structured layer and the optical interference layer are optimized only for this polarized light. In addition, switching the polarized light to be reflected and the polarized light to be transmitted is feasible by properly adjusting the structured layer.

As described above, a polarized beam splitting layer according to each exemplary embodiment includes a structured layer (SWS grating structure) and at least one optical interference layer (thin film) combined with the structured layer to constitute a polarizing beam splitter.

Therefore, an exemplary embodiment targets only one polarized light component for optimization while restricting the other polarized light component so as to effect total reflection. Therefore, design having higher degree of freedom can be realized. Thus, a polarizing beam splitter having a simple arrangement capable of arbitrarily controlling transmission efficiency can be obtained.

TABLE 1

Design Standard 1

| Wavelength | 407 nm |
|---|---|
| Incident Angle | 43 to 47 deg. |
| Reflectance of Reflected Light | 95%< |
| Reflectance of Transmitted Light | 6 to 10% |

TABLE 2

Design Standard 2

| Wavelength | 400 to 700 nm |
|---|---|
| Incident Angle | 45 deg. |
| Reflectance of Reflected Light | 99%< |
| Reflectance of Transmitted Light | <0.5% |

TABLE 3

| | | Comparative Example 1 | First Exemplary Embodiment | Second Exemplary Embodiment | Third Exemplary Embodiment | Fourth Exemplary Embodiment |
|---|---|---|---|---|---|---|
| Incident Medium 11 | Refractive Index | 1.80 | 1.80 | 1.70 | 1.80 | 1.80 |
| Optical Interference Layer 12 | Refractive Index | — | 1.38 | — | 1.64 | 1.68 |
| | Thickness | — | 169 | — | 51 | 93 |
| Structured Layer 13 | Total Reflection polarization | S | S | P | P | P |
| | Material Refractive Index | 1.80 | 2.55 | 2.55 | 2.00 | 2.55 |
| | Filling Factor f | 0.44 | 0.22 | 0.22 | 0.30 | 0.22 |
| | Refractive Index of Polarized Light A | 1.22 | 1.12 | 1.12 | 1.15 | 1.12 |
| | Refractive Index of Polarized Light B | 1.44 | 1.57 | 1.57 | 1.42 | 1.57 |
| | Thickness | 475 | 330 | 633 | 450 | 450 |
| Optical Interference Layer 14 | Refractive Index | — | 1.38 | 1.45 | 1.48 | 1.68 |
| | Thickness | — | 50 | 60 | 187 | 93 |
| Optical Interference Layer 14 | Refractive Index | — | — | — | 1.64 | — |
| | Thickness | — | — | — | 109 | — |
| Exit medium 15 | Refractive index | 1.80 | 1.80 | 1.70 | 1.80 | 1.80 |

Next, as an optical apparatus using a polarizing beam splitter according to an exemplary embodiment of the present invention, an optical pickup apparatus for an optical disk recording/reproduction apparatus, or for a reproduction apparatus, is described below. This kind of pickup apparatus includes, for example, a laser light source (e.g., a semiconductor laser diode) capable of serving as a light source unit, a laser beam receiving unit, and an optical system configured to guide the laser beam.

Figure 7:
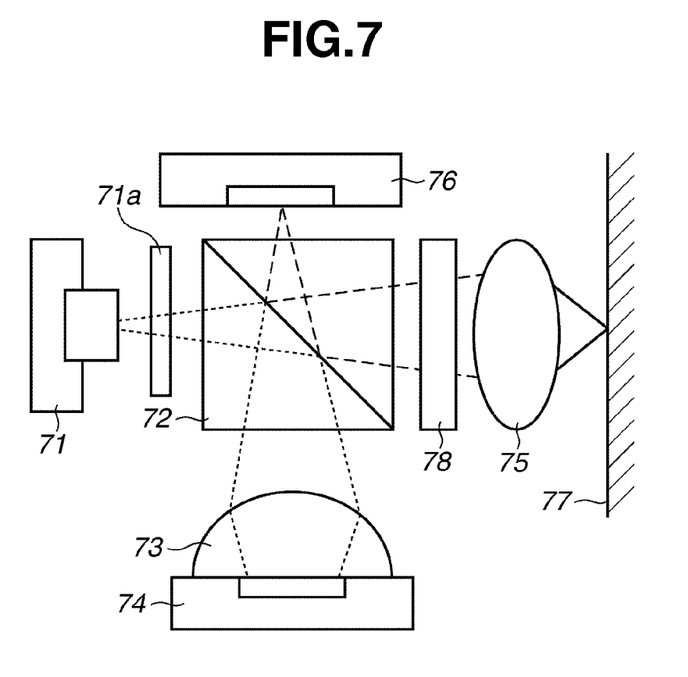
FIG. 7 illustrates an optical pickup apparatus including a polarizing beam splitter according to an exemplary embodiment of the present invention.

FIG. 7 illustrates a light source and its peripheral optical system for an optical disk pickup apparatus including a polarizing beam splitter according to an exemplary embodiment of the present invention.

A light flux from a light source unit 71 enters a polarizing beam splitter 72 via a polarizing plate 71a that can adjust the direction of polarized light. Part of the polarized light is reflected by the polarizing beam splitter 72 and enters a monitoring light-receiving unit (light-sensitive element) 74 via a collective lens (collective optical system) 73. The polarizing beam splitter 72 is disposed between the light source unit 71 and an optical disk 77.

On the other hand, the rest of the polarized light is transmitted through the polarizing beam splitter 72 and reaches an image-forming plane of the optical disk 77 via a phase plate 78 and a collective lens 75. The polarization of the reflected light, which is optically modulated by the optical disk 77, is rotated by the phase plate 78. More specifically, rotation of the polarized light is approximately 90 degrees when the reflection light enters the polarizing beam splitter 72 again. The polarized light is totally reflected by the polarizing beam splitter 72 and detected by a light-receiving unit 76 to reproduce signals.

Figure 14:
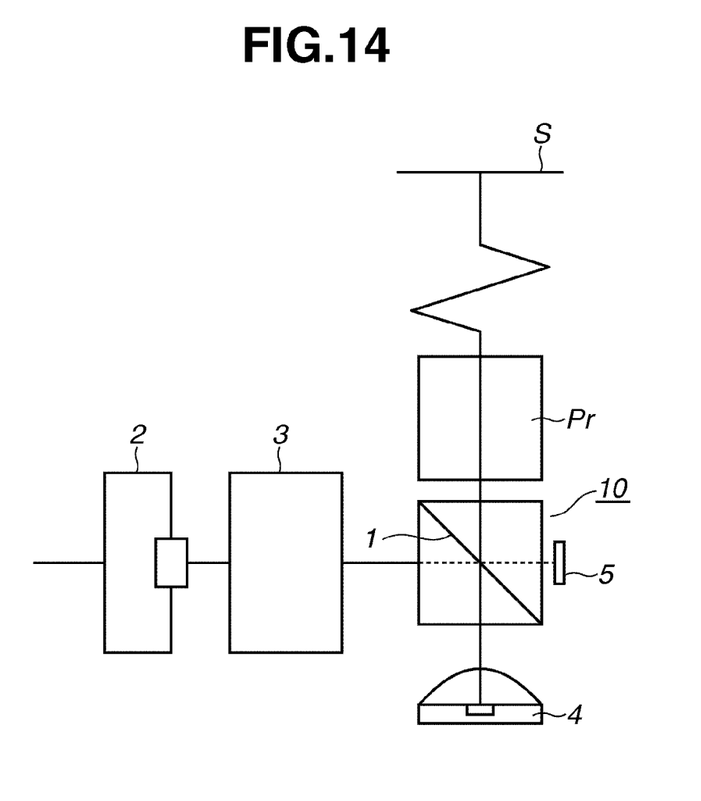
FIG. 14 illustrates an image projection apparatus according to an exemplary embodiment of the present invention.

FIG. 14 illustrates an image projection apparatus including a polarizing beam splitter according to an exemplary embodiment of the present invention.

A light flux from a light source unit 2 passes through an illumination unit (illumination optical system) 3, which enables light of a predetermined polarization direction to enter a polarizing beam splitter 1. Part of the polarized light in the predetermined polarization direction is reflected by the polarizing beam splitter 1 and is monitored (detected) by a photo-detector (detection unit) 4. The polarizing beam splitter 1 is disposed in the optical path of the illumination unit 3.

The polarized light having passed through the polarizing beam splitter 1 enters a reflection-type image display element (e.g., liquid crystal panel) 5 and is optically modulated based on image information.

The light optically modulated by the image display element 5, of which the polarization direction is rotated by 90 degrees, enters the polarizing beam splitter 1. The light is totally reflected by the polarizing beam splitter 1 and output to a projection optical system Pr.

The projection optical system Pr projects image information of the panel 5 (single plate type) on a screen S.

According to exemplary embodiments, one polarized light component can be effectively reflected by using the total reflection and the other polarized light component can be designed independently. Therefore, exemplary embodiments can provide a polarizing beam splitter capable of properly adjusting the quantity of reflected/transmitted light to obtain excellent incident angle characteristics and broadband characteristics.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-300270 filed Nov. 20, 2007, which is hereby incorporated by reference herein in its entirety.

What is claimed is:

1. A polarizing beam splitter comprising:
a periodic structure including a plurality of structured portions periodically disposed in a first direction at intervals equal to or shorter than a used wavelength, wherein the periodic structure satisfies a condition that polarized light, of an incident light flux, that vibrates in one direction is totally reflected;
an incident medium disposed on an incident side of the periodic structure, and
an optical interference layer including at least one thin uniform film layer disposed between the periodic structure and the incident medium, the optical interference layer having a thickness equal to or greater than 30 nm and equal to or smaller than the used wavelength,
wherein the polarized light vibrating in the one direction is incident on the periodic structure at an angle greater than a critical angle,
wherein a polarized light vibrating in another direction perpendicular to the one direction among the incident light flux is incident on the periodic structure at an angle smaller than a critical angle, and
wherein refractive indices of the thin uniform film layer are the same at least in the one and another directions.

2. The polarizing beam splitter according to claim 1, further comprising an exit medium disposed on an exit side of the periodic structure,
wherein the following relationship is satisfied when n' and n'' represent equivalent refractive indices of the periodic structure relative to two incident polarized beams vibrating in the one and another directions, $n_a$ represents the refractive index of the optical interference layer, and $n_b$ represents the refractive index of the incident medium or the exit medium of the polarizing beam splitter, $$\frac{n' + n''}{2} < n_a < n_b.$$

3. The polarizing beam splitter according to claim 1, wherein the optical interference layer has a thickness equal to or greater than 60 nm.

4. The polarizing bean splitter according to claim 1, wherein the optical interference layer has a thickness equal to or greater than 30 nm and equal to or smaller than 187 nm.

5. The polarizing beam splitter according to claim 1, wherein the thickness of the optical interference layer is set such that reflectance of the polarized light vibrating in the another direction is 6 to 10% when an incident angle of the polarized light entering into the periodic structure is 43 to 47 degrees.

6. An optical disk recording/reproduction apparatus comprising:
a light source unit;
a collective optical system configured to guide light from the light source unit to an optical disk;
a light-sensitive element configured to detect reproduction signal light from the optical disk; and
a polarizing beam splitter disposed in an optical path between the light source unit and the optical disk,
wherein the polarizing beam splitter comprises:
a periodic structure including a plurality of structured portions periodically disposed in a first direction at intervals equal to or shorter than a used wavelength, wherein the periodic structure satisfies a condition that, of an incident light flux, polarized light that vibrates in one direction is totally reflected;
an incident medium disposed on an incident side of the periodic structure, and
an optical interference layer including at least one thin uniform film layer disposed between the periodic structure and the incident medium, the optical interference layer having a thickness equal to or greater than 30 nm and equal to or smaller than the used wavelength, wherein the polarized light vibrating in the one direction is incident on the periodic structure at an angle greater than a critical angle, wherein a polarized light vibrating in another direction perpendicular to the one direction among the incident light flux is incident on the periodic structure at an angle smaller than a critical angle, and wherein refractive indices of the thin uniform film layer are the same at least in the one and another directions.

7. An image display apparatus comprising:
a light source unit;
an image display element;
an illumination optical system configured to illuminate the image display element with light from the light source unit; and
a polarizing beam splitter disposed in an optical path of the illumination optical system;
wherein the polarizing beam splitter comprises:
   a periodic structure including a plurality of structured portions periodically disposed in a first direction at intervals equal to or shorter than a used wavelength, wherein the periodic structure satisfies a condition that, of an incident light flux, polarized light that vibrates in one direction is totally reflected;
   an incident medium disposed on an incident side of the periodic structure, and
   an optical interference layer including at least one thin uniform film layer disposed between the periodic structure and the incident medium, the optical interference layer having a thickness equal to or greater than 30 nm and equal to or smaller than the used wavelength, wherein the polarized light vibrating in the one direction is incident on the periodic structure at an angle greater than a critical angle, wherein a polarized light vibrating in another direction perpendicular to the one direction among the incident light flux is incident on the periodic structure at an angle smaller than a critical angle, and wherein refractive indices of the thin uniform film layer are the same at least in the one and another directions.

* * * * *